(12) United States Patent
Barrie et al.

(10) Patent No.: US 7,703,000 B2
(45) Date of Patent: Apr. 20, 2010

(54) SYSTEMS AND METHODS FOR CONTEXTUAL MARK-UP OF FORMATTED DOCUMENTS

(75) Inventors: John M. Barrie, Berkeley, CA (US); Colin Sherman, Oakland, CA (US); Michael Kang, Berkeley, CA (US)

(73) Assignee: Iparadigms LLC, Oakland, CA (US)

( * ) Notice: Subject to any disclaimer, the term of this patent is extended or adjusted under 35 U.S.C. 154(b) by 605 days.

(21) Appl. No.: 10/772,848

(22) Filed: Feb. 5, 2004

(65) Prior Publication Data

US 2005/0028087 A1 Feb. 3, 2005

Related U.S. Application Data

(60) Provisional application No. 60/447,379, filed on Feb. 13, 2003.

(51) Int. Cl.
*G06F 15/16* (2006.01)
(52) U.S. Cl. .................. 715/230; 715/248
(58) Field of Classification Search .......... 715/500, 715/511, 512, 513, 522, 523, 200, 229, 234, 715/248, 249, 230
See application file for complete search history.

(56) References Cited

U.S. PATENT DOCUMENTS

| | | | |
|---|---|---|---|
| 5,452,442 A | 9/1995 | Kephart | |
| 5,627,748 A | 5/1997 | Baker et al. | |
| 5,845,278 A | 12/1998 | Kirsch et al. | |
| 6,029,167 A | 2/2000 | Evans | |
| 6,119,124 A | 9/2000 | Broder et al. | |
| 6,192,165 B1 | 2/2001 | Irons | |
| 6,240,409 B1 | 5/2001 | Aiken | |
| 6,262,728 B1 | 7/2001 | Alexander | |
| 6,272,485 B1 * | 8/2001 | Sragner | 707/1 |
| 6,282,698 B1 | 8/2001 | Baker et al. | |
| 6,381,618 B1 | 4/2002 | Jones et al. | |
| 6,546,406 B1 | 4/2003 | DeRose et al. | |
| 6,732,090 B2 * | 5/2004 | Shanahan et al. | 707/3 |
| 6,778,979 B2 * | 8/2004 | Grefenstette et al. | 707/3 |
| 6,820,075 B2 * | 11/2004 | Shanahan et al. | 707/3 |
| 2002/0054059 A1 | 5/2002 | Schneiderman | |
| 2002/0068263 A1 | 6/2002 | Mishkin et al. | |
| 2002/0132216 A1 * | 9/2002 | Dohrmann | 434/362 |
| 2002/0184085 A1 | 12/2002 | Lindia et al. | |

(Continued)

FOREIGN PATENT DOCUMENTS

WO WO 0007110 A1 2/2000

(Continued)

OTHER PUBLICATIONS

Sullivan, et al.; "Computer-Mediated Peer Review of Student Papers," Nov./Dec. 1998, Journal of Education for Business, pp. 117-121.

(Continued)

*Primary Examiner*—Stephen S Hong
*Assistant Examiner*—Gregory J Vaughn
(74) *Attorney, Agent, or Firm*—Casimir Jones, S.C.

(57) ABSTRACT

The present invention relates to systems and methods for the contextual mark-up of formatted electronic documents. These systems and methods have many applications, including use for online editing and education.

9 Claims, 16 Drawing Sheets

(Adding marks to a document)

U.S. PATENT DOCUMENTS

| | | | |
|---|---|---|---|
| 2003/0033287 A1* | 2/2003 | Shanahan et al. | 707/3 |
| 2003/0033288 A1* | 2/2003 | Shanahan et al. | 707/3 |
| 2003/0061201 A1* | 3/2003 | Grefenstette et al. | 707/3 |
| 2003/0069877 A1* | 4/2003 | Grefenstette et al. | 707/2 |
| 2004/0205130 A1* | 10/2004 | Banerjee et al. | 709/205 |
| 2004/0205448 A1* | 10/2004 | Grefenstette et al. | 715/500 |
| 2005/0022114 A1* | 1/2005 | Shanahan et al. | 715/513 |

FOREIGN PATENT DOCUMENTS

| | | |
|---|---|---|
| WO | WO 0056055 A2 | 9/2000 |
| WO | WO 0072114 A1 | 11/2000 |
| WO | WO 01/28644 A1 | 4/2001 |
| WO | WO 0142979 A1 | 6/2001 |

OTHER PUBLICATIONS

Gehringer, Edward F., "Strategies and Mechanisms for Electronic Peer Review," Oct. 18-21, 2000, ASEE/IEEE Frontiers in Education Conference, Kansas City, MO, Session F-1B, pp. 2-7.

Lin, et al., "Web-based peer assessment: feedback for students with various thinking-styles," Jan. 20, 2001 Journal of Computer Assisted Learning, pp. 420-432.

* cited by examiner

Assignment #1: Assignment 1     marking paper: napolean   author: Smith, Eileen markup mode | rubric breakdown | hide marks | clear marks | save & close

[1] this is a good start. remember to keep in mind that your introduction sets the tone for the rest of the paper: a good intro and thesis, when carried through properly, can really make a paper.

[2] i like this thought; you have to be careful, however, about making assertions that are don backed up directly in the body of your paper.

see rubric: [ins] rubric info quickmark: [#][⊙][¶][H][⁋][⌐][↑][¶][sp][cap][lc][del]    grade: [25] of (100) pts [↑]    markup help d →

Napolean (Bonaparte) Was a Hero

Born in Corsica in 1769 Napoleon Bonaparte rose through the midst of the chaos of the French Revolution to become Emperor of the French. He is regarded by many as a military genius, by others as an opportunist. Perhaps he was both.

In any case, this site is an effort to collect together paintings of the great man and [8] to make available works by and about him. To the right are thumbnails of larger portraits. Click on the thumbnails to see the picture in all its digital glory.

At the age of ten, Napoleon left his native Corsica for a military school in Brienne, France, where his academic success was minimal. After a year at the Military Academy in Paris, he was commissioned second lieutenant in the artillery in 1785. He watched the fall of the Bastille in 1789 with approval but from a distance, and spent much of his time over the next few years in Corsica. where he angered the Corsican nationalist Paoli, and his family fled to Marseille in 1793 [sp]

In that year he commanded a successful attack on British and royalist troops, and was promoted to brigadier general. He was given the command of the

Assignment #1: Assignment 1      reviewing paper: Dizzy Dean2    author: Jones, Jack view topic question(s): 1 2 3 4    view metrics    peer review help

On a scale of 1 to 5, rate the this paper on the following criteria:

1   2   3   4   5

1. how well the thesis is supported by specific evidence in the body of the paper.    ○ ○ ○ ○ ○
2. the persuasiveness of this paper's thesis.    ○ ○ ○ ○ ○
3. how interesting this paper's thesis was to you.    ○ ○ ○ ○ ○

[submit ▶]

Napolean (Bonaparte) Was a Hero

Born in Corsica in 1769 Napoleon Bonaparte rose through the midst of the chaos of the French Revolution to become Emperor of the French. He is regarded by many as a military genius, by others as an opportunist. Perhaps he was both.

In any case, this site is an effort to collect together paintings of the great man and to make available works by and about him. To the right are thumbnails of larger portraits. Click on the thumbnails to see the picture in all its digital glory.

At the age of ten, Napoleon left his native Corsica for a military school in Brienne, France, where his academic success was minimal. After a year at the Military Academy in Paris, he was commissioned second lieutenant in the artillery in 1785. He watched the fall of the Bastille in 1789 with approval but from a distance, and spent much of his time over the next few years in Corsica, where he angered the Corsican nationalist Paoli, and his family fled to Marseille in 1793

In that year he commanded a successful attack on British and royalist troops, and was promoted to brigadier general. He was given the command of the

FIG. 11

Welcome, William Bixby. | my classes | user info | user type | logout | help!

Now viewing: The New Art College : gradebook test class

▸ This is your class homepage. Click the create a new assignment link to add an assignment to your class homepage. Click an assignment's inbox button to view submissions that have been made to the assignment. Click an assignment's submit button to submit a paper.

class home  students  peer review  gradebook  libraries  calendar  preferences

| attendance | add entry | prefs | scale | export | | | | Assignment 1 | | Our First Peer Review | | Assignment 2 | | Assignm |
|---|---|---|---|---|---|---|---|---|---|---|---|---|---|---|
| max total points: 350 | | max graded points: 250 | | | | | | 100 pts | grade ↪ | 50 pts | grade ↪ | 100 pts | grade ↪ | 100 pts |
| student | points | % | grade | late | absent | | | | | | | | | |
| Hernandez, Melissa | 276 | 110.4% | A+ | 0 | 0 | | | 90 | A- | 90 | A+ | — | — | — |
| Jones, Jack | 107* | 71.3% | C- | 0 | 0 | | | 95 | A | 12 | F | — | — | — |
| Newman, Shelly | 147* | 98.0% | A+ | 0 | 0 | | | 67 | D | 80 | A+ | — | — | — |
| Patterson, Billy | 165* | 110.0% | A+ | 0 | 0 | | | 75 | C | 90 | A+ | 96 | A | — |
| Smith, Eileen | 185* | 123.3% | A+ | 0 | 0 | | | 85 | B | 100 | A+ | — | — | — |
| Class average: | 159.6 | 111.3% | A+ | 0.0 | 0.0 | | | 82.4 | B | 74.9* | A+ | 96.0* | A | — |

Copyright © 1998-2003 iParadigms, LLC. All Rights Reserved. | usage policy | privacy pledge | helpdesk | research resources turnitin

FIG. 12

Welcome, William Bixby. | my classes | user info | user type | logout | help!

Now viewing: The New Art College : gradebook test class

This is your class portfolio. The left column of your portfolio lists assignments and peer reviews. The right column shows your submissions. Click the submit button assignment to submit a paper.

class portfolio  peer review  my grades  calendar

| assignment list | | your portfolio | | | |
|---|---|---|---|---|---|
| # | assignment | submit | title | submitted | contents | reviews |
| 1 | Assignment 1 | | Crouching Sponge, Hidden Marmo... ← a | 12-12-03 | .doc | 2 ← b |
| | 12-10-03 \| 12-11-03 | | completed : My First Peer Review | 12-12-03 | - | - |
| | PR 1 (peer review 1) | | completed : How Many Fingers Are On Your... | 12-12-03 | - | - |

Copyright © 1998-2003 iParadigms, LLC. All Rights Reserved. | usage policy | privacy pledge | helpdesk | research resources turnitin

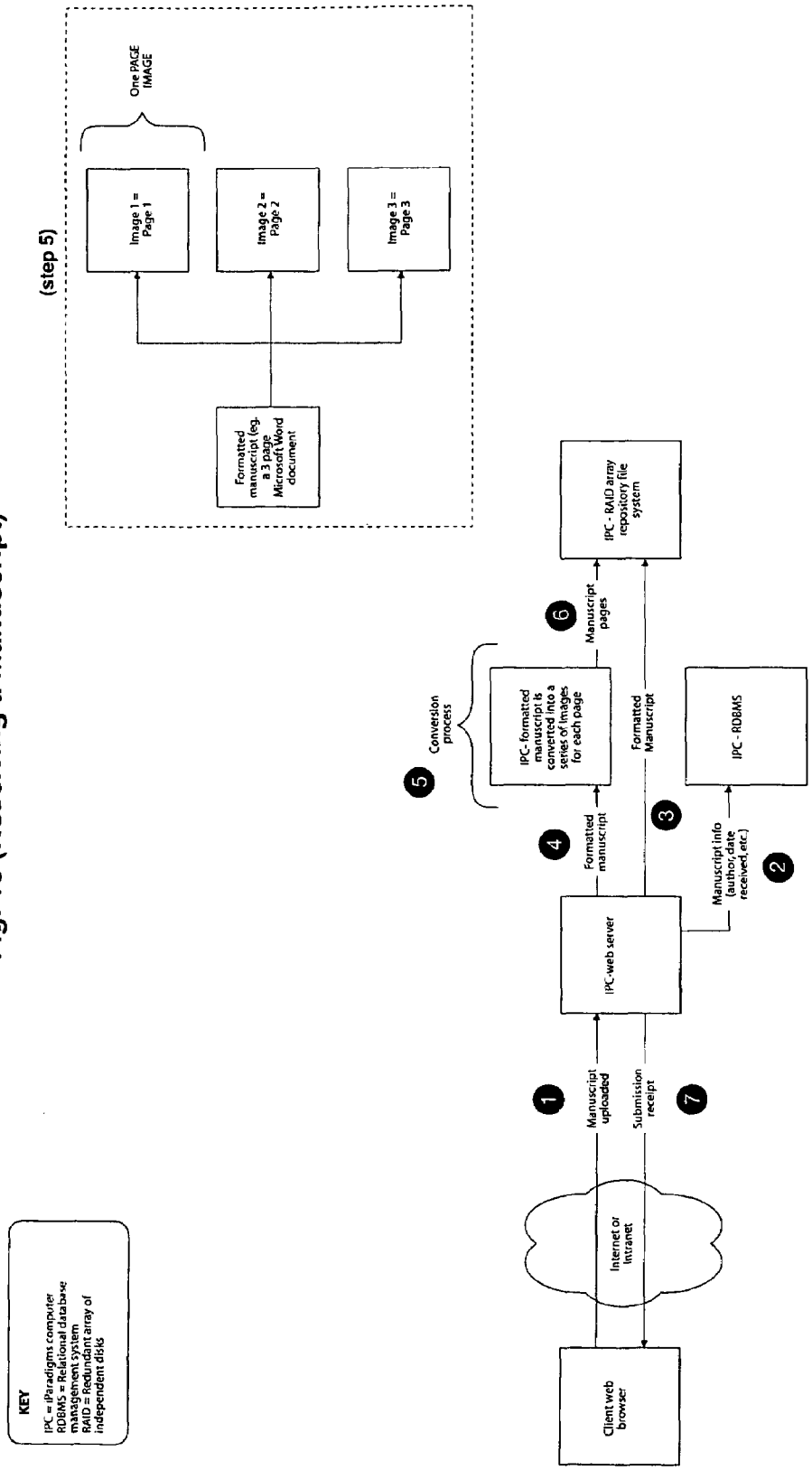
Fig. 13 (Receiving a manuscript)

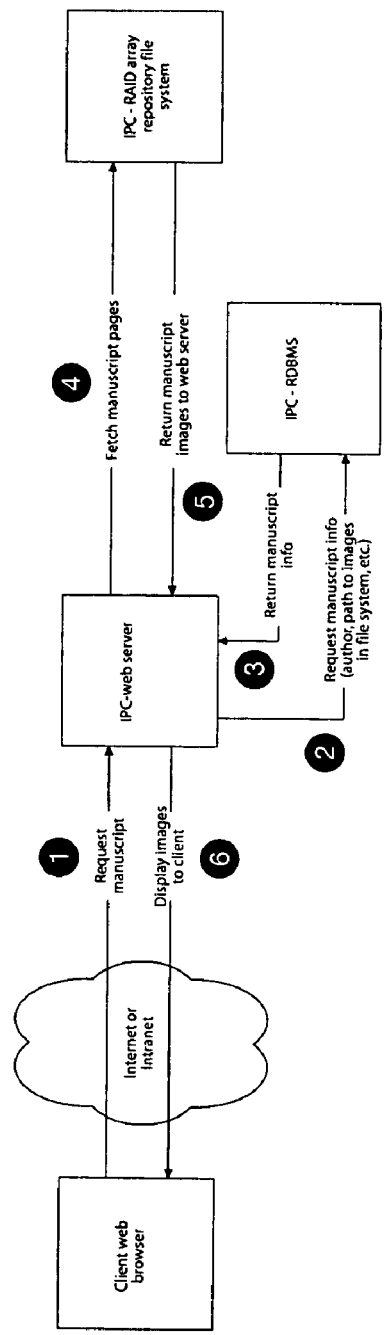
Fig. 14 (Displaying the document)

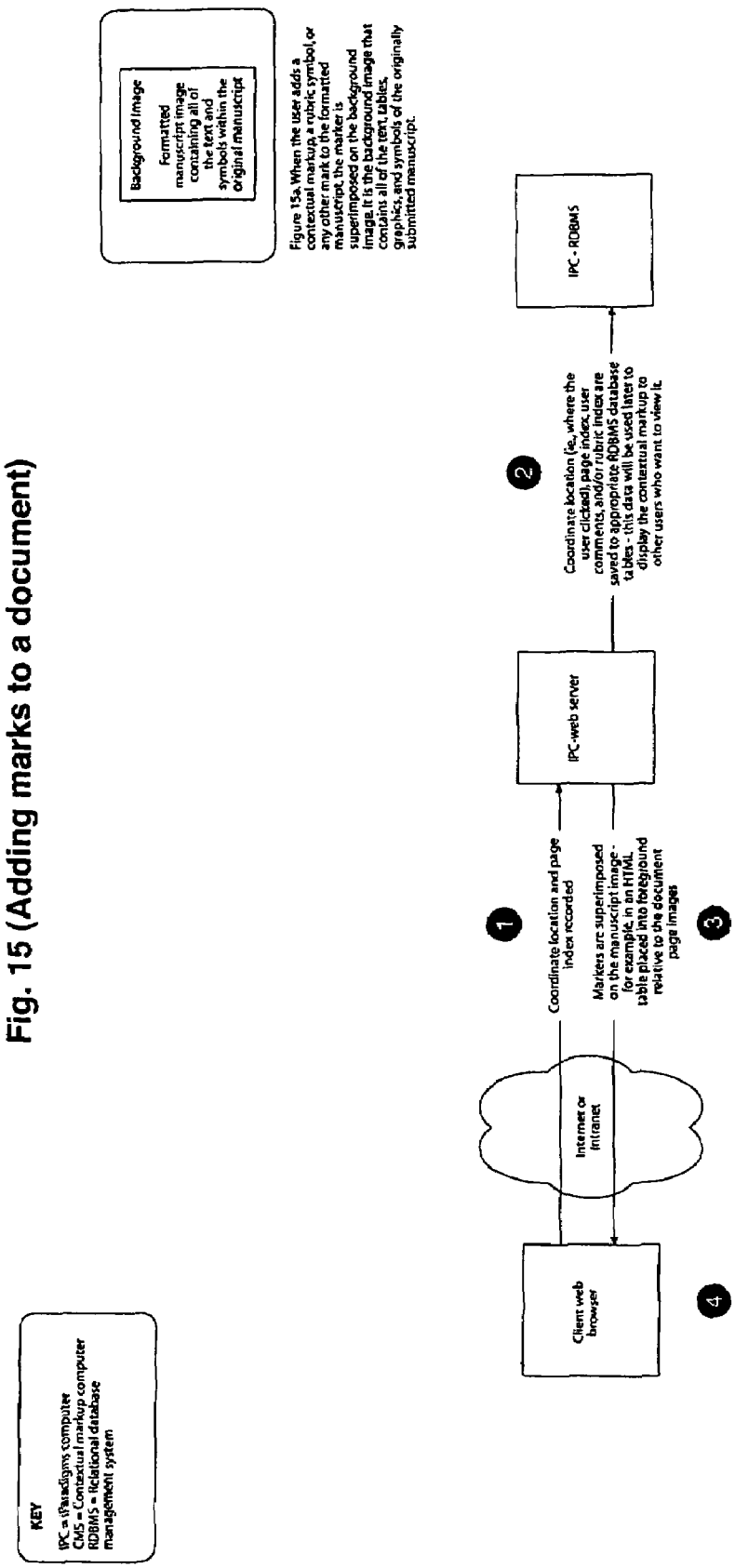

Fig. 16 (Displaying marks and comments for a document)
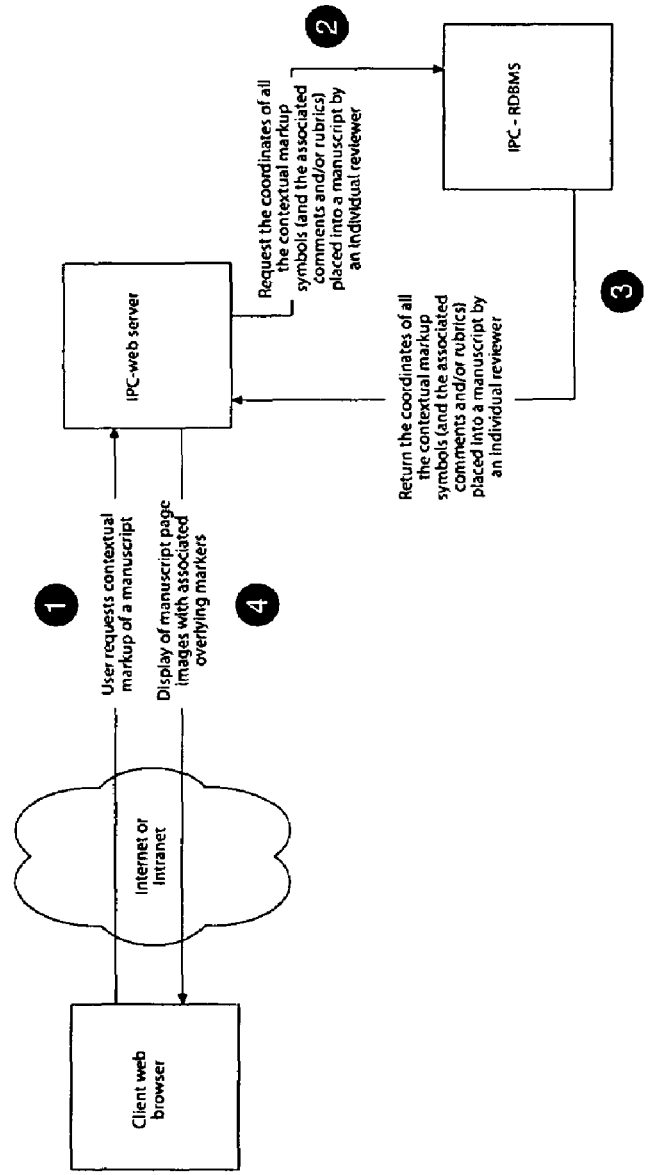

SYSTEMS AND METHODS FOR CONTEXTUAL MARK-UP OF FORMATTED DOCUMENTS

The present invention claims priority to U.S. Provisional Patent Application Ser. No. 60/447,379, filed Feb. 13, 2003, the entire disclosure of which is hereby incorporated by reference in its entirety.

FIELD OF THE INVENTION

The present invention relates to systems and methods for the contextual mark-up of formatted electronic documents. These systems and methods have many applications, including use for online editing and education.

BACKGROUND OF THE INVENTION

The Internet has permitted users with web browsers to easily exchange information over the Internet. Educational or academic materials, for example, may be distributed to users for taking an educational course on-line or for facilitating grading, peer review, and the like. In order for the online exchange of such materials to successfully replace or supplement in-classroom materials, users must be provided with various features so that the on-line system provides certain benefits over in-classroom models. Accordingly, a need exists for various features for an on-line educational system and related systems.

DESCRIPTION OF THE DRAWINGS

FIG. 5 shows an exemplary "inbox" in some embodiments of the present invention.

FIG. 7 shows an exemplary marked up formatted document in some embodiments of the present invention.

FIG. 8 shows an exemplary rubric library in some embodiments of the present invention.

FIG. 10 shows an exemplary peer review application in some embodiments of the present invention.

FIG. 11 shows an exemplary gradebook in some embodiments of the present invention.

FIG. 12 shows an exemplary student portfolio in some embodiments of the present invention.

FIG. 13 shows exemplary information flow during the receipt of objects in some embodiments of the present invention. 1) a user submits a formatted manuscript to web servers; 2) meta-information regarding manuscript is stored into a database; 3) manuscript is saved to disk; 4 & 5) manuscript is converted into a series of images; 6) images are stored to disk; 7) user receives a confirmation that steps 1-6 were successfully completed (or that the manuscript as has been received, etc.).

FIG. 14 shows exemplary information flow during the displaying of a document in some embodiments of the present invention. 1) reviewer requests a document to review/grade; 2) request for meta-information is sent to database; 3) meta-information regarding manuscript is returned; 4) request for document images is sent to the storage array; 5) document images are returned; 6) meta-information and document images are displayed to the user.

FIG. 15 shows exemplary information flow during addition of marks to a document in some embodiments of the present invention. 1) user requests marked-up version of formatted document; 2) request is sent to database; 3) all mark coordinates and any associated comments, rubrics, or editorial symbols are extracted from the database; 4) user receives formatted document with all mark-up or review comments superimposed on top of the formatted document. When the user adds a contextual markup, a rubric symbol, or any other mark to the formatted manuscript, the marker is superimposed on the background image. It is the background image that contains all of the text, tables, graphics, and symbols of the originally submitted manuscript.

FIG. 16 shows exemplary information flow during the displaying of marks in some embodiments of the present invention. 1) user requests marked-up version of formatted document; 2) request is sent to database; 3) all mark coordinates and any associated comments, rubrics, or editorial symbols are extracted from the database; 4) user receives formatted document with all mark-up or review comments superimposed on top of the formatted document.

SUMMARY OF THE INVENTION

Figure 1:
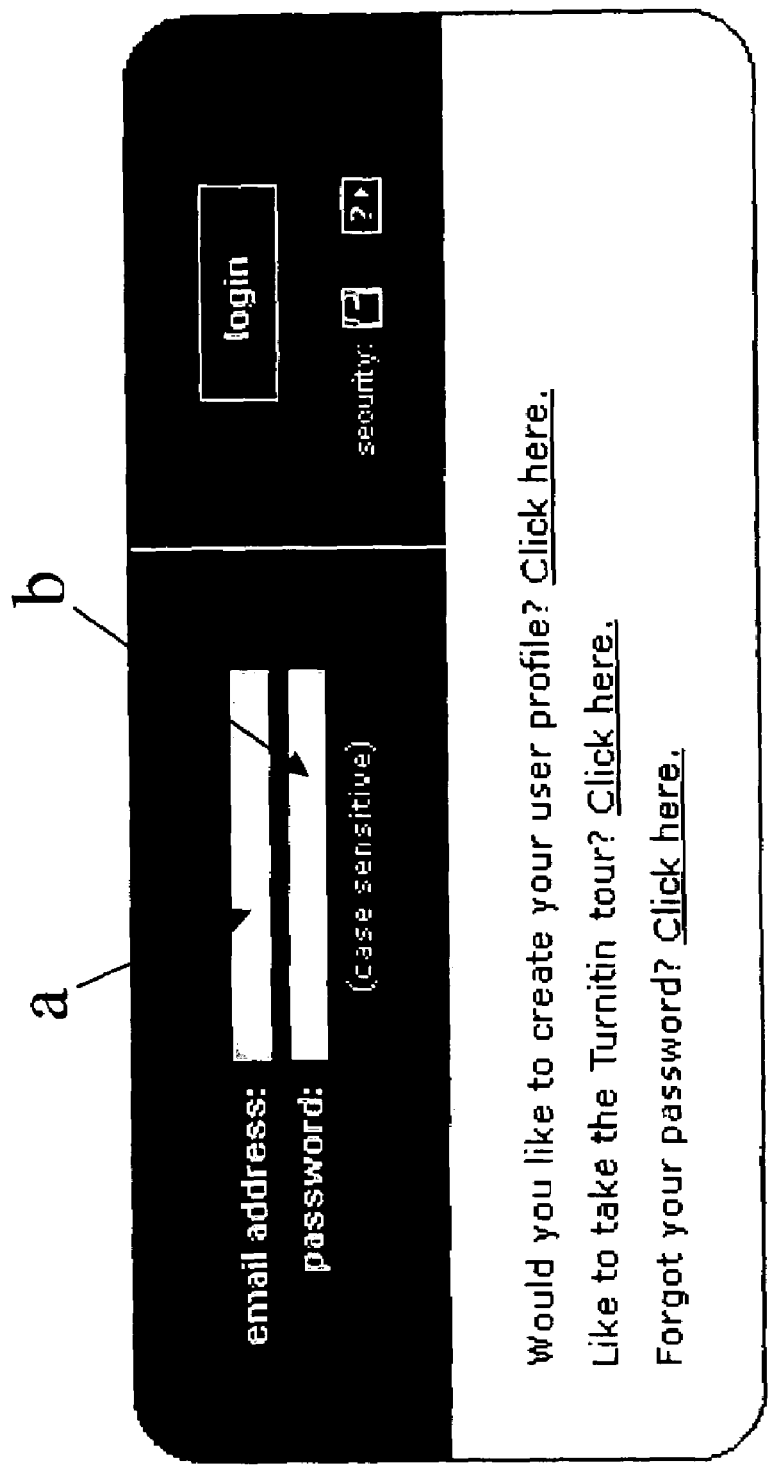
FIG. 1 shows an exemplary user entry screen in some embodiments of the present invention.

The present invention provides systems and methods for the contextual mark-up of formatted electronic documents. For example, the present invention provides systems and methods for adding editorial marks to fully formatted electronic documents exchanged over the Internet. Such systems and methods find use for on-line educational systems, peer review of works of authorship, and any other application where there is a desire to add contextual mark-ups of formatted documents. In some embodiments, the present invention includes systems and methods for assessing the originality of written materials. For example, the present invention provides systems and methods for detecting plagiarism of documents. The present invention further provides novel software and related systems to improve the use and management of formatted documents in an on-line environment.

For example, in some embodiments, the present invention provides a system for generating contextual markups (e.g., editorial comments, corrections, annotations, comments, etc.) of formatted documents (i.e., documents produced in a standard format, e.g., .pdf, .tif, etc.), comprising a processor or software configured to receive documents over an electronic communication network, convert unformatted documents into formatted documents (if necessary—e.g., if not already formatted), permit a user to add contextual markups to formatted documents derived from said received document to generate a markup document, and display said markup document on a web browser. In some embodiments, the formatted document is an image file (e.g., TIF, JPG, PNG, GIF, BMP, RLE, WMF, EMF, DIB, etc.). In some embodiments, the contextual markups are added to an invisible image that maps to the image file.

In some preferred embodiments, the processor or software is further configured to assess the originality of the received document. In some embodiments, the processor or software is further configured to store information pertaining to the received document in a database (e.g., identity of submitter, grade information, editorial comments, editorial rubrics, questions, and answers).

The present invention also provides methods of using such systems. For example, the present invention provides a method for generating contextual markups of formatted documents, comprising the steps of a) providing the system above, b) inputting a document into the processor or software under conditions such that a formatted document is generated (if necessary); adding contextual markups to the formatted document to generate a markup document; and displaying the markup document.

The systems and methods of the present invention may be applied using any type of computer system, including traditional desktop computers, as well as other computing devices (e.g., calculators, phones, watches, personal digital assistants, etc.). In some embodiments, the computer system comprises computer memory or a computer memory device and a computer processor. In some embodiments, the computer memory (or computer memory device) and computer processor are part of the same computer. In other embodiments, the computer memory device or computer memory are located on one computer and the computer processor is located on a different computer. In some embodiments, the computer memory is connected to the computer processor through the Internet or World Wide Web. In some embodiments, the computer memory is on a computer readable medium (e.g., floppy disk, hard disk, compact disk, DVD, etc). In other embodiments, the computer memory (or computer memory device) and computer processor are connected via a local network or intranet.

In some embodiments, "a processor" may in fact comprise multiple processors in communication with each other for carrying out the various processing tasks required to reach the desired end result. For example, the computer of an intermediary service provider may perform some processing or information storage and the computer of a customer linked to the intermediary service provider may perform other processing or information storage.

DEFINITIONS

To facilitate an understanding of the present invention, a number of terms and phrases are defined below:

The term "system" is used to refer to an on-line document management system, an example of which is described in the present specification. The term "database" is used to refer to a data structure for storing information for use by the system, and an example of such a data structure in described in the present specification.

The term "user" refers to a person using the systems or methods of the present invention. The term "instructor" refers to a person teaching or otherwise providing content or instruction for an on-line educational system. A person may be both a user and an instructor.

The term "assignments" refers to work to be completed by a user for an on-line course, and examples of assignments are provided below. Assignments may include work to be completed by a user without requiring responsive information sent to an instructor, and they may also include work to be completed by a user requiring responsive information. Assignments may also include or use learning tools.

As used herein, the terms "processor" and "central processing unit" or "CPU" are used interchangeably and refer to a device that is able to read a program from a computer memory (e.g., ROM or other computer memory) and perform a set of steps according to the program.

As used herein, the terms "computer memory" and "computer memory device" refer to any storage media readable by a computer processor. Examples of computer memory include, but are not limited to, RAM, ROM, computer chips, digital video discs (DVD), compact discs (CDs), hard disk drives (HDD), and magnetic tape.

As used herein, the term "computer readable medium" refers to any device or system for storing and providing information (e.g., data and instructions) to a computer processor. Examples of computer readable media include, but are not limited to, DVDs, CDs, hard disk drives, magnetic tape and servers for streaming media over networks.

As used herein, the term "encode" refers to the process of converting one type of information or signal into a different type of information or signal to, for example, facilitate the transmission and/or interpretability of the information or signal. For example, image files can be converted into (i.e., encoded into) electrical or digital information. Likewise, light patterns can be converted into electrical or digital information that provides an encoded video capture of the light patterns.

As used herein, the term "hyperlink" refers to a navigational link from one document to another, or from one portion (or component) of a document to another. Typically, a hyperlink is displayed as a highlighted word or phrase that can be selected by clicking on it using a mouse to jump to the associated document or documented portion.

As used herein, the term "Internet" refers to any collection of networks using standard protocols. For example, the term includes a collection of interconnected (public and/or private) networks that are linked together by a set of standard protocols (such as TCP/IP, HTTP, and FTP) to form a global, distributed network. While this term is intended to refer to what is now commonly known as the Internet, it is also intended to encompass variations that may be made in the future, including changes and additions to existing standard protocols or integration with other media (e.g., television, radio, etc). The term is also intended to encompass non-public networks such as private (e.g., corporate) Intranets.

As used herein, the terms "World Wide Web" or "web" refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols that may be used in place of (or in addition to) HTML and HTTP.

As used herein, the term "web site" refers to a computer system that serves informational content over a network using the standard protocols of the World Wide Web. Typically, a Web site corresponds to a particular Internet domain name and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

As used herein, the term "HTML" refers to HyperText Markup Language that is a standard coding convention and set of codes for attaching presentation and linking attributes to informational content within documents. During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally, in specifying how the Web browser is to display the document, HTML tags can be used to create links to other Web documents (commonly referred to as "hyperlinks").

As used herein, the term "HTTP" refers to HyperText Transport Protocol that is the standard World Wide Web client-server protocol used for the exchange of information (such as HTML documents, and client requests for such documents) between a browser and a Web server. HTTP includes a number of different types of messages that can be sent from the client to the server to request different types of server actions. For example, a "GET" message, which has the format GET, causes the server to return the document or file located at the specified URL.

As used herein, the term "URL" refers to Uniform Resource Locator that is a unique address that fully specifies the location of a file or other resource on the Internet. The general format of a URL is protocol://machine address:port/path/filename. The port specification is optional, and if none is entered by the user, the browser defaults to the standard port for whatever service is specified as the protocol. For example, if HTTP is specified as the protocol, the browser will use the HTTP default port of 80.

As used herein, the term "in electronic communication" refers to electrical devices (e.g., computers, processors, etc.) that are configured to communicate with one another through direct or indirect signaling. For example, a conference bridge that is connected to a processor through a cable or wire, such that information can pass between the conference bridge and the processor, are in electronic communication with one another. Likewise, a computer configured to transmit (e.g., through cables, wires, infrared signals, telephone lines, etc) information to another computer or device, is in electronic communication with the other computer or device.

As used herein, the term "transmitting" refers to the movement of information (e.g., data) from one location to another (e.g., from one device to another) using any suitable means.

As used herein, the term "XML" refers to Extensible Markup Language, an application profile that, like HTML, is based on SGML. XML differs from HTML in that: information providers can define new tag and attribute names at will; document structures can be nested to any level of complexity; any XML document can contain an optional description of its grammar for use by applications that need to perform structural validation. XML documents are made up of storage units called entities, which contain either parsed or unparsed data. Parsed data is made up of characters, some of which form character data, and some of which form markup. Markup encodes a description of the document's storage layout and logical structure. XML provides a mechanism to impose constraints on the storage layout and logical structure, to define constraints on the logical structure and to support the use of predefined storage units. A software module called an XML processor is used to read XML documents and provide access to their content and structure.

As used herein, the term "intermediary service provider" refers to an agent providing a forum for users to interact with each other (e.g., identify each other, make and receive assignments, etc). For example, an intermediary service provider may provide a forum for faculty members to create and distribute assignments to students in a class (e.g., by defining the assignment and setting dates for completion), or provide a forum for students to receive and respond to assignments such as peer review assignments. The intermediary service provider also allows, for example, users to maintain a portfolio of work submitted in response to all assignments for a particular class or project and for the collection of data (such as customized questions and rubrics) which can be used to supplement knowledge base data in a library of such data. In some embodiments, the intermediary service provider is a hosted electronic environment located on the Internet or World Wide Web.

DETAILED DESCRIPTION OF THE INVENTION

The present invention provides system and methods for users to review, grade, comment on, and contextually markup a formatted manuscript, graph, image, spreadsheet, and the like, for the purposes of transmitting those reviews, grades, comments, and contextual commentaries to other individuals or groups or for archival purposes. For example, the present invention provides systems and methods for instructors who would like to grade their students' manuscripts in a digital fashion. Benefits of the systems and methods of the present invention include, but are not limited to: 1) a digital record of all manuscript comments can be maintained and tracked; 2) an author's writing progress can be tracked over time by having a computer calculate statistics regarding the rubrics or comments inserted into the manuscript; 3) temporal efficiencies are created; 4) contextual markup can supplement static commentary; and 5) reviews and grades can be normalized across multiple reviewers.

While much of the following description illustrates the invention through use of an educational environment, skilled artisans will understand that the invention is not so limited, and is generally applicable to a wide range of applications.

In one preferred embodiment, the systems and methods of the present invention are used by reviewers who are commenting on formatted text documents. Such uses include any that involve contextually marking of a formatted object, including, but not limited to, a grant review process, a journal review process, and an editor making changes to any type of formatted material (including images such as marketing material or music, or an accountant commenting on a spreadsheet of numbers and graphs).

A preferred embodiment of the invention is presented in the figures. For example, in one implementation, a user first enters the system using a computer in electronic communication with a processor running the system of the present invention. For example, a user authenticates themselves with a username (FIG. 1a) and password (FIG. 1b).

Figure 2:
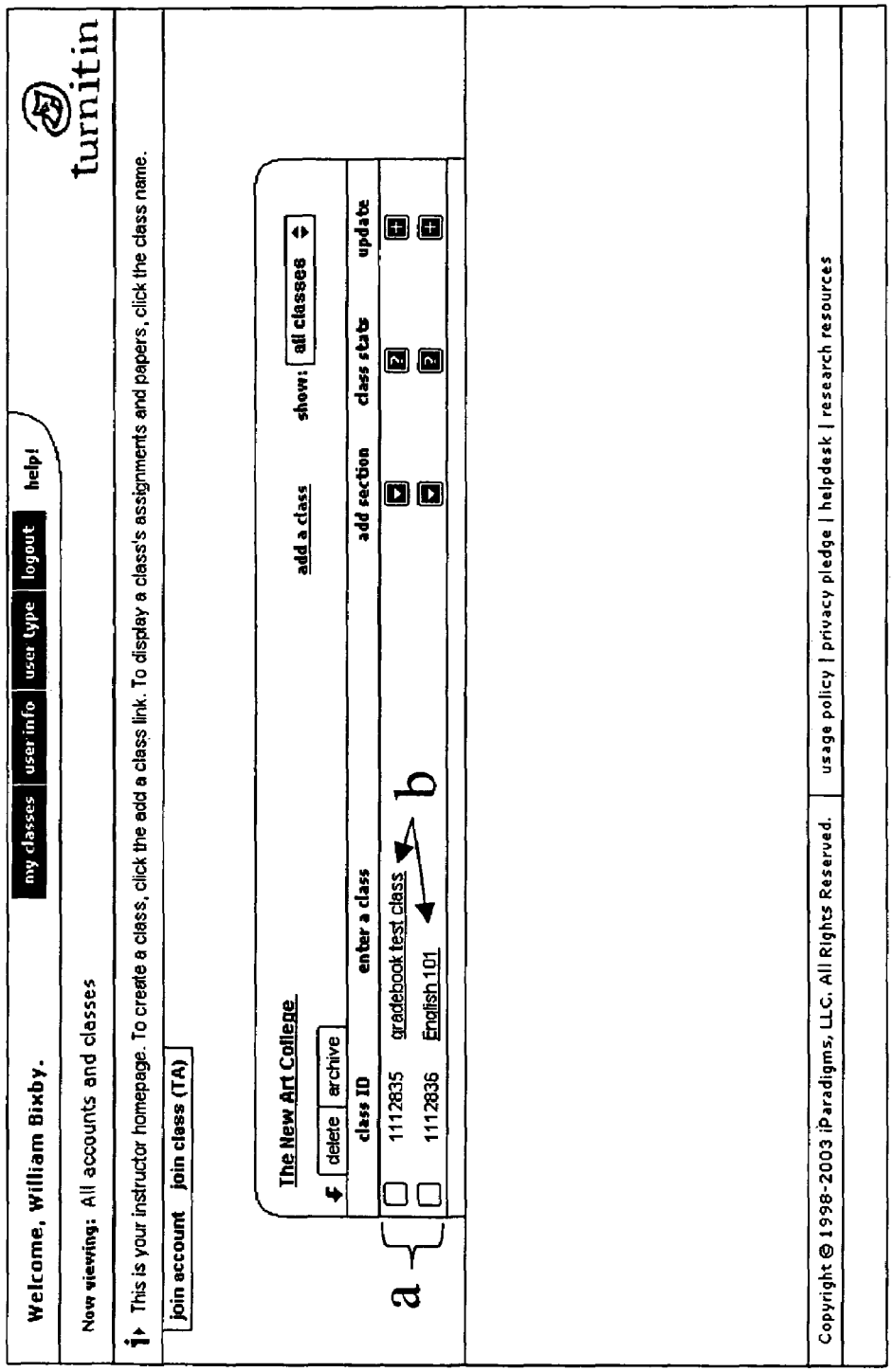
FIG. 2 shows an exemplary user homepage in some embodiments of the present invention.
Figure 3:
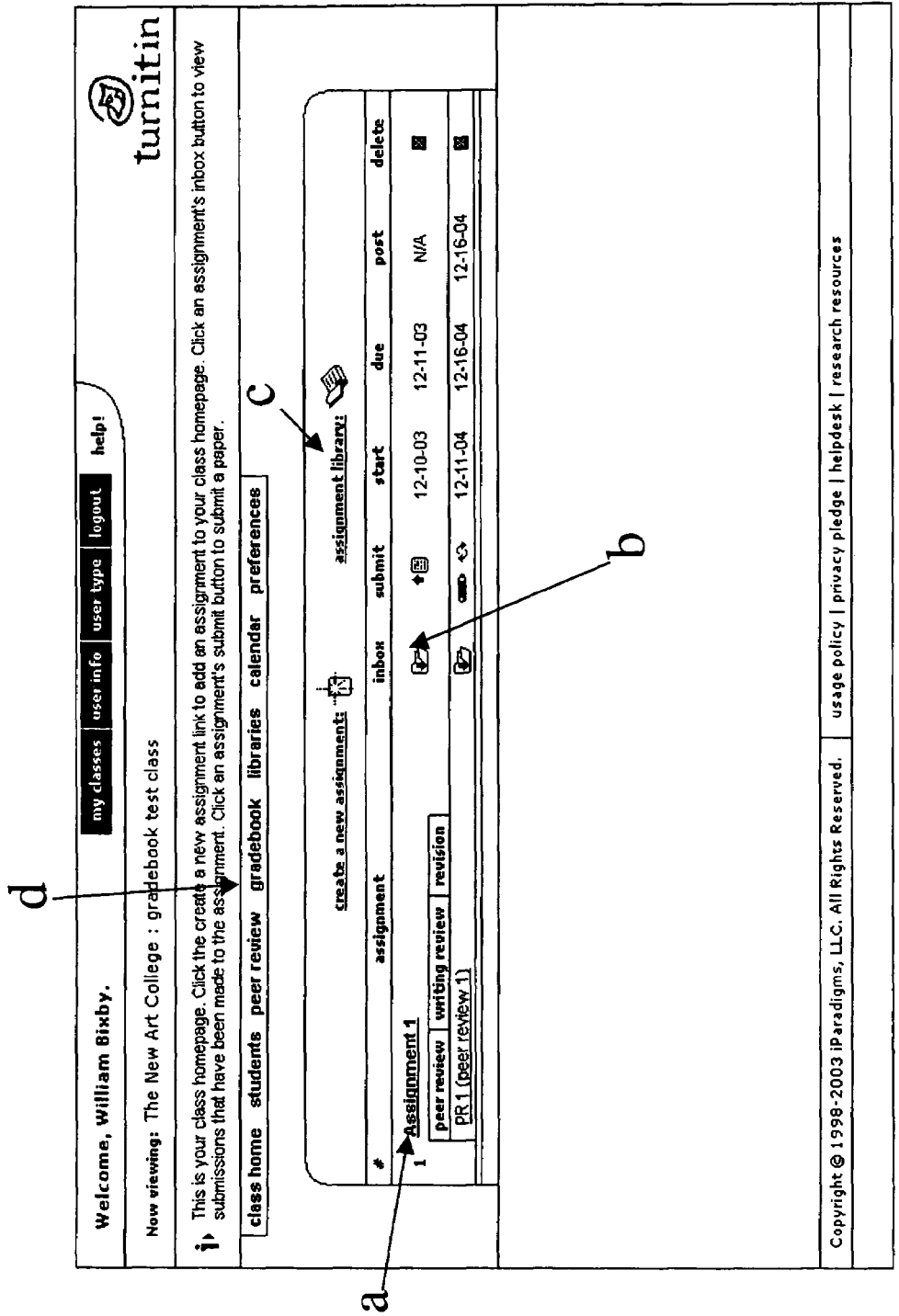
FIG. 3 shows an exemplary class homepage in some embodiments of the present invention.

In the case of faculty or other user who will insert contextual markup into a formatted manuscript, the user goes to their "homepage" (FIG. 2), that lists all of the classes they are teaching (FIG. 2a). For any class, the faculty can then proceed (FIG. 2b) to the listing of all the assignments that are requested of the members (e.g., students) of that class (e.g., book reports, digital pictures, music scores, etc.) (FIG. 3).

For any particular assignment with a class (FIG. 3a), the faculty can proceed to their class "inbox" (FIG. 3b) to view all of the objects submitted to satisfy that assignment. For example, by clicking on the inbox icon (FIG. 3b), the faculty sees information regarding all of the manuscripts submitted for the assignment "Assignment 1" (FIG. 3a).

Figure 4:
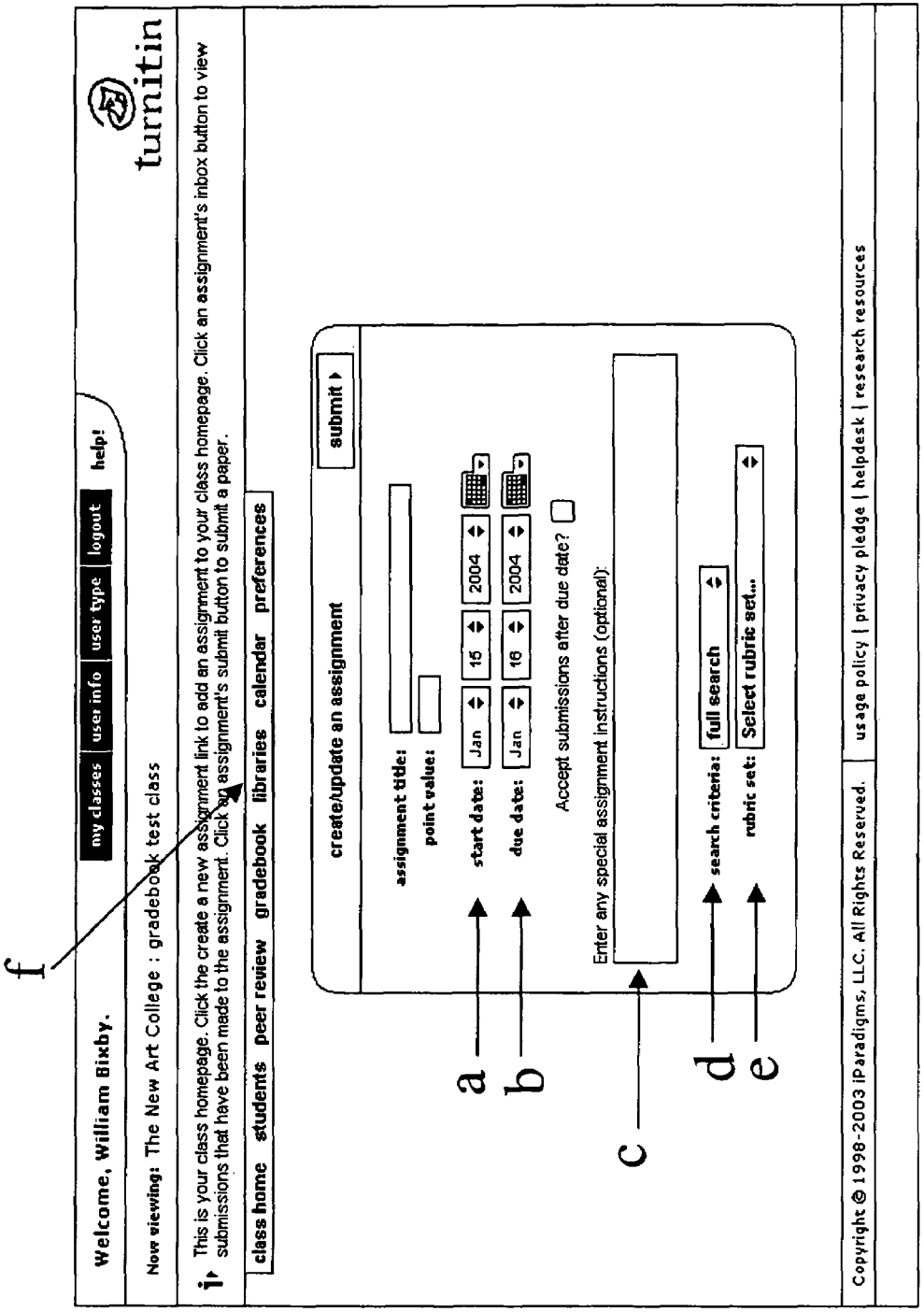
FIG. 4 shows an exemplary assignment creation page in some embodiments of the present invention.

Different assignments (e.g., containers for digital object submission) can be created for a class (FIG. 3c). As part of the assignment creation, the user asks that objects be submitted beginning on a certain date (FIG. 4a) and that object submission ends on a certain date (FIG. 4b). The user also includes other pertinent information regarding object submission (FIG. 4c). Each object submitted to the system can be checked against various databases for levels of originality (FIG. 4d) and the user can select from libraries of rubrics (FIG. 4e) to use for the contextual markup of submitted works (See e.g., U.S. Pat. Publ. No. 20030164849, herein incorporated by reference in its entirety).

Figure 5:
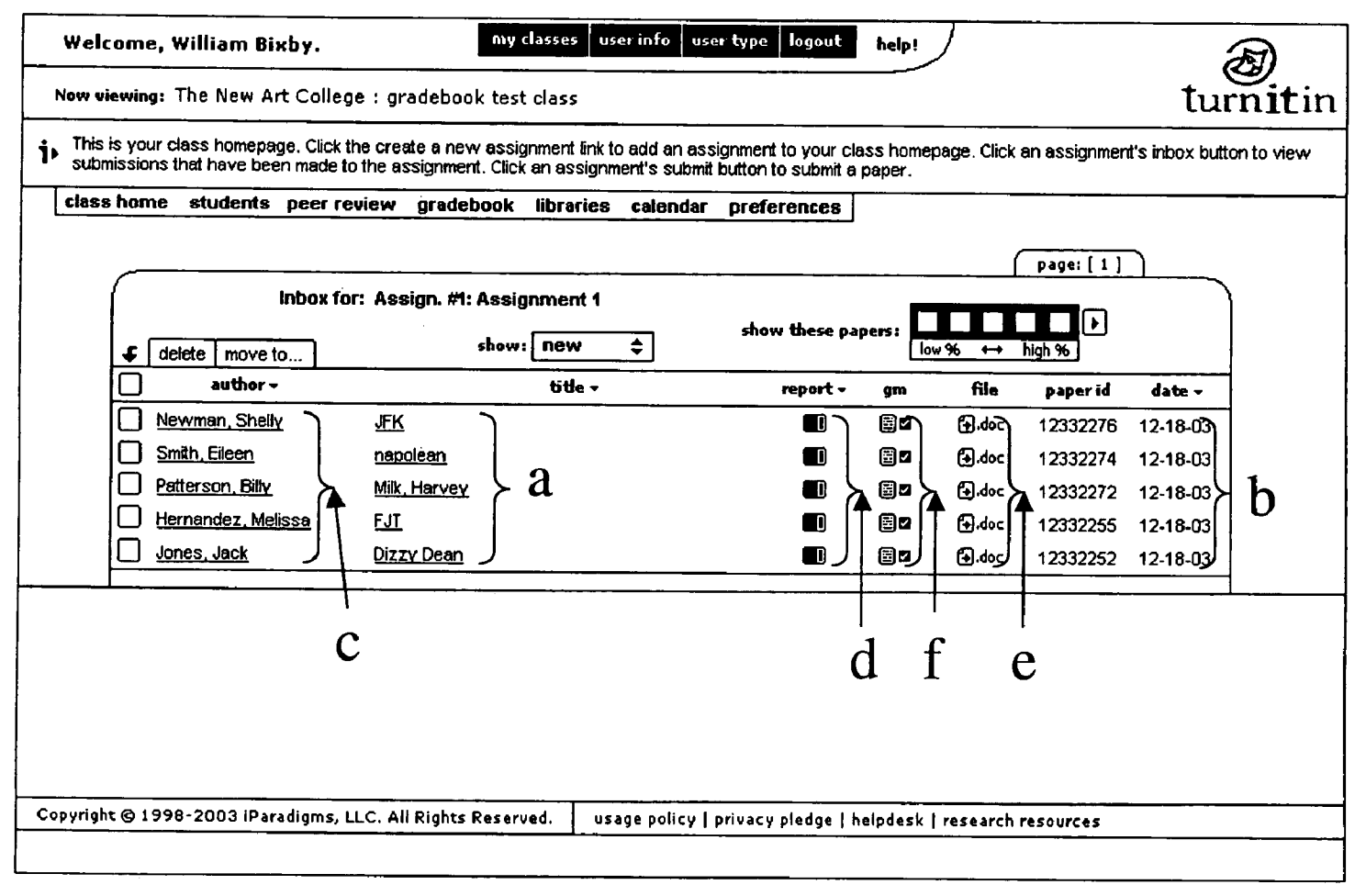

When the user proceeds to their "inbox" for a particular assignment (FIG. 5), they can see the various objects submitted (FIG. 5a), when they were submitted (FIG. 5b), who submitted them (FIG. 5c), an icon (e.g., color-coded to indicate originality levels) that links to the "originality report", that documents any sections of the submitted object that were unoriginal (FIG. 5d), a link to download the object's original file from the file system (FIGS. 5e/14, step 1), and a link to the contextual markup system (FIG. 5f).

In preferred embodiments, objects submitted to the system follow the route illustrated in FIG. 13. In embodiments, where the submitted documents are textual documents, the system converts the formatted documents into a series of images prior to contextual markup (FIG. 13, step 5). This step accounts for the lack of uniform display of formatted text (e.g., from a word processor) within a web browser. After the conversion, those images then retain all of the formatting from the word processor and can be displayed in a web browser.

In some preferred embodiments, the objects requested for contextual markup are delivered to the person who will markup those objects according to the route shown in FIG. 14.

In some embodiments, where the reviewer is marking up images and not text, there may be a bandwidth cost associated with downloading every manuscript page image every time a change is made to that page. Thus, in some embodiments, for that reason (among others—for example, see FIG. 16), the systems of the present invention allow the user to add their marks to an invisible image that maps exactly onto each image of each page of the manuscript. This means that the user only needs to download each manuscript image once, because their web browser will then cache or store those images. When a mark is added to the manuscript, it appears directly on top of the manuscript image without any modifications to the manuscript image itself.

Figure 6:
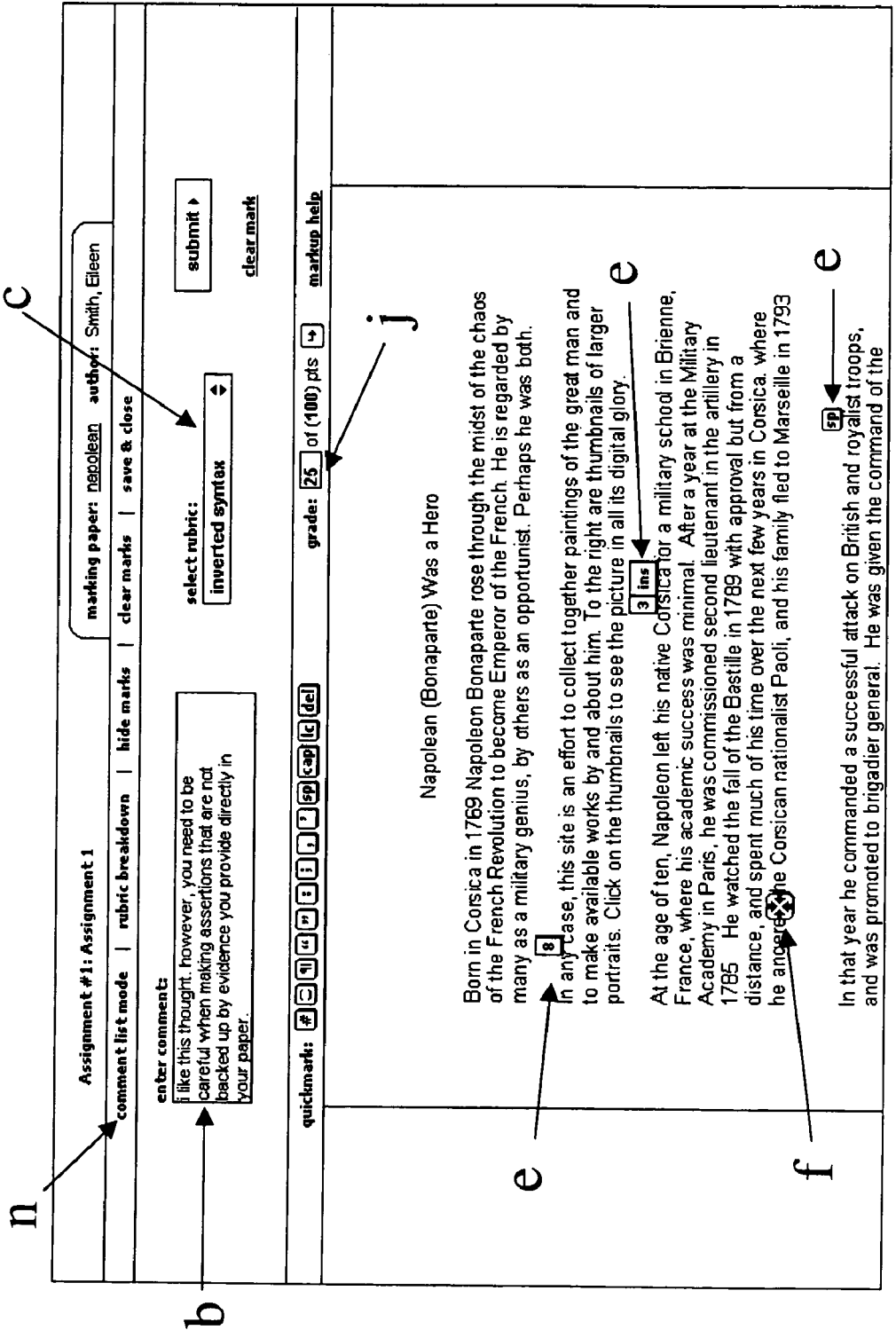
FIG. 6 shows an exemplary markup of a formatted document in some embodiments of the present invention.

When the user selects a manuscript for contextual markup (FIG. 5f), they are sent into a contextual markup system (FIG. 6). In preferred embodiments, this system generally operates as per FIG. 15. Marks (FIG. 6e/f) are placed directly onto the formatted version of the manuscript and they are linked to commentary (FIG. 6b) and/or rubrics (FIG. 6c).

Users can then view the contextual markups for a manuscript by clicking on the markup icon from their "inbox" (FIG. 5f) and then proceeding to the commentary listing (FIG. 6n). Students or authors access contextual markup (FIG. 12b) for a submitted object (FIG. 12a) from their "portfolio" page (FIG. 12). This then takes the user to the "commentary listing" page (FIG. 7). In some preferred embodiments, users view commentary for a submitted object as outlined in FIG. 16.

Figure 8:
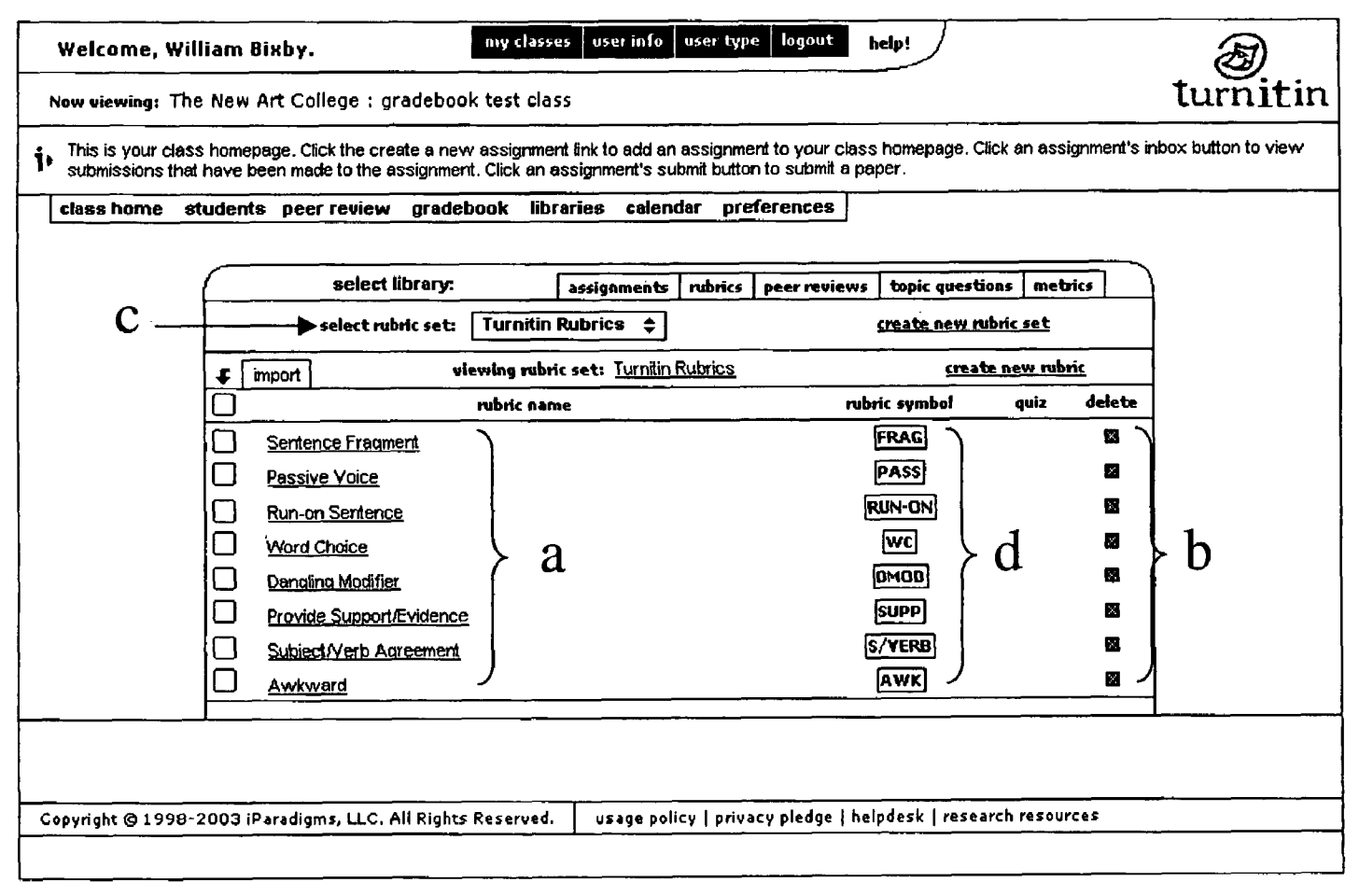

Libraries of rubrics (e.g., that are used to evaluate submitted works—FIGS. 4f/6c) can be managed from a "rubric library" page (FIG. 8). From this page, users can add rubrics to a particular library (FIG. 8a), delete rubrics from various libraries (FIG. 8b), move rubrics between libraries (FIG. 8c) and confirm customized symbols for rubrics (FIGS. 8d/7d).

Figure 9:
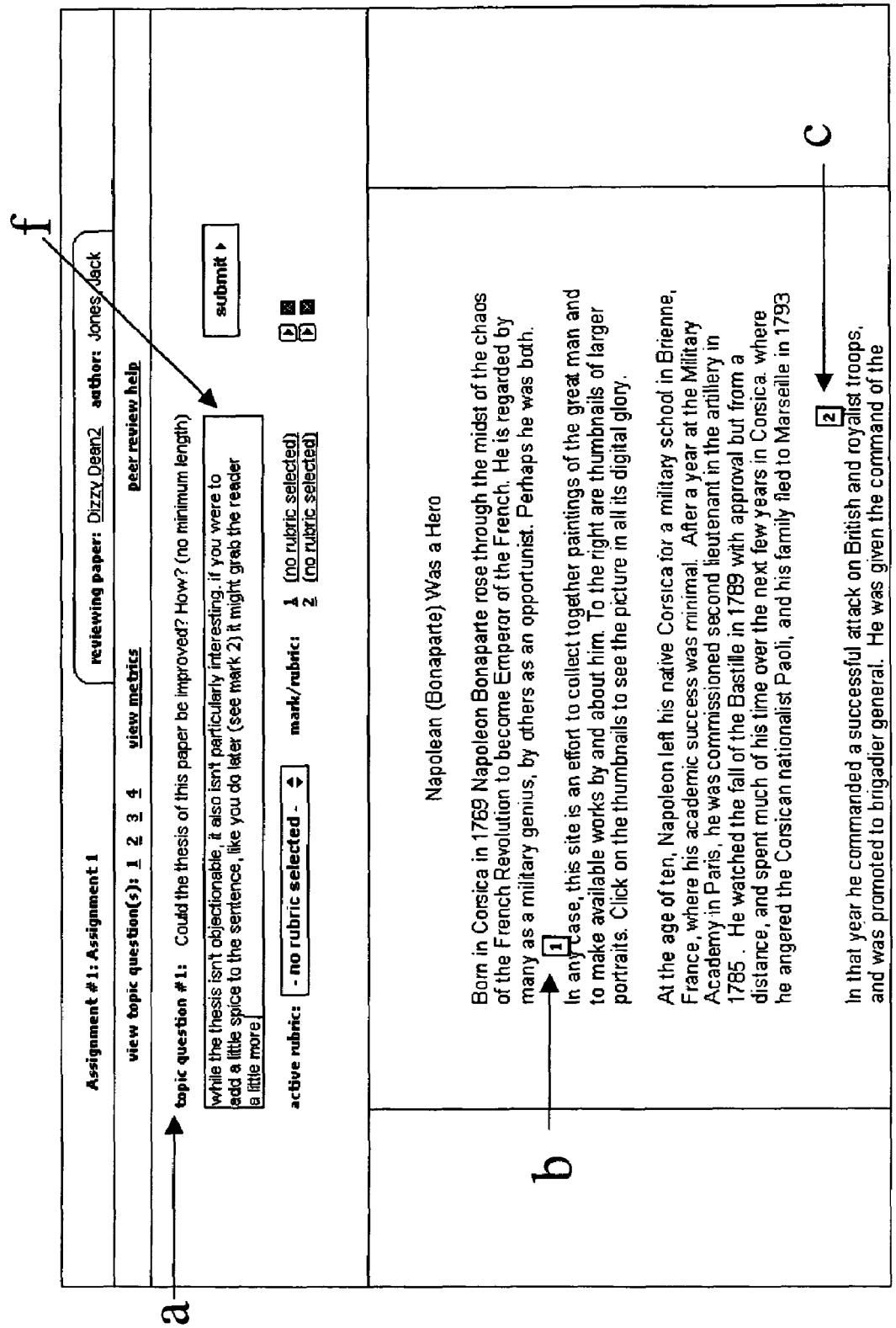
FIG. 9 shows an exemplary peer review markup in some embodiments of the present invention.

Contextual markup can also be used as an adjunct to the peer review process (FIGS. 9/10). For example, when a reviewer is answering a static question (FIG. 9a), they can refer to symbols placed in a manuscript (FIGS. 9b/c) from within their answer (FIG. 9f).

When grades, scores, etc. are associated with a submitted object (FIG. 6j), in some embodiments, that information is managed and accessed via a centralized gradebook (FIGS. 3d/11).

In some embodiments, the systems and methods of the present invention are provided as an application service provider (ASP) (e.g., can be accessed by users within a web-based platform via a web browser across the Internet; is bundled into a network-type appliance and run within an institution or an intranet; or is provided as a software package and used as a stand-alone system on a single computer).

Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the present invention.

We claim:

1. A system for generating contextual markups of formatted documents, comprising a processor and software configured to receive documents over an electronic communication network, wherein said documents are selected from the group consisting of assignments, students' manuscripts, grant applications and journal manuscripts, convert submitted formatted documents to standardized formatted documents, wherein said formatted documents are image files, permit a user to add contextual markups to said standardized formatted documents derived from said submitted formatted documents to generate a markup document, wherein said contextual markups are selected from the from the group consisting of editorial comments, corrections, annotations, rubrics, symbols and comments added by said user, and wherein said contextual markups are images that are added to an invisible image that maps exactly onto each image of said image file, and wherein said image file is not modified, and display said markup document comprising said contextual markups on a web browser.

2. The system of claim 1, wherein said processor or software is further configured to store information pertaining to said received document in a database.

3. The system of claim 2, wherein said information is selected from the group consisting of identity of submitter, grade information, editorial comments, editorial rubrics, questions, and answers.

4. A method for generating contextual markups of formatted documents, comprising:

a) providing a processor and software configured to receive documents over an electronic communication network, convert submitted formatted documents to standardized formatted documents, permit a user to add contextual markups to formatted documents derived from said submitted formatted documents to generate a markup document, and display said markup document on a web browser;

b) inputting a document into said processor or software under conditions such that a standardized formatted document is generated wherein said standardized formatted document is an image file, wherein said document is selected from the group consisting of assignments, students' manuscripts, grant applications and journal manuscripts;

c) adding contextual markups to said standardized formatted document to generate a markup document wherein said contextual markups are selected from the group consisting of editorial comments, corrections, annotations, rubrics, symbols and comments, and wherein said contextual markups are images that are added to an invisible image that maps exactly onto each image of said image file, and wherein said image file is not modified; and d) displaying said markup document comprising said contextual markups.

5. The method of claim 4, wherein said document comprises a manuscript.

6. The method of claim 4, wherein said document comprises an educational assignment.

7. The method of claim 4, wherein said displaying comprises making said markup document available over an Internet.

8. The method of claim 4, wherein said contextual markups are added by an instructor.

9. The method of claim 4, herein said contextual markups are added by a peer reviewer.

* * * * *